(12) United States Patent
Lee

(10) Patent No.: US 11,157,785 B2
(45) Date of Patent: Oct. 26, 2021

(54) IMAGE FORMING APPARATUS FOR DIAGNOSIS CONSUMABLE DEVICE AND METHOD FOR IMAGE FORMING THEREOF

(71) Applicant: HEWLETT-PACKARD DEVELOPMENT COMPANY, L.P., Spring, TX (US)

(72) Inventor: Ki Youn Lee, Seongnam-si (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/644,023

(22) PCT Filed: Aug. 24, 2018

(86) PCT No.: PCT/KR2018/009810
§ 371 (c)(1),
(2) Date: Mar. 3, 2020

(87) PCT Pub. No.: WO2019/146863
PCT Pub. Date: Aug. 1, 2019

(65) Prior Publication Data
US 2021/0064946 A1  Mar. 4, 2021

(30) Foreign Application Priority Data

Jan. 23, 2018 (KR) .......................... 10-2018-0008157

(51) Int. Cl.
*G06K 15/02* (2006.01)
*G06K 15/12* (2006.01)
*G06K 15/00* (2006.01)
*G06K 15/14* (2006.01)
*G03G 15/00* (2006.01)

(52) U.S. Cl.
CPC ....... *G06K 15/027* (2013.01); *G03G 15/5033* (2013.01); *G06K 15/1228* (2013.01); *G06K 15/14* (2013.01); *G06K 15/408* (2013.01)

(58) Field of Classification Search
CPC ............. G06K 15/027; G06K 15/1228; G06K 15/408; G03G 15/5033
USPC ....................................... 358/1.14, 1.9, 1.15
See application file for complete search history.

(56) References Cited

U.S. PATENT DOCUMENTS

| 2001/0028804 A1 | 10/2001 | Hisano |
| 2005/0134874 A1* | 6/2005 | Overall .................. G03G 15/01 358/1.9 |
| 2007/0161115 A1 | 7/2007 | Schwartz |

(Continued)

FOREIGN PATENT DOCUMENTS

| EP | 2827573 A | 1/2015 |
| JP | 2002244368 A | 8/2002 |

(Continued)

*Primary Examiner* — Quang N Vo
(74) *Attorney, Agent, or Firm* — Staas & Halsey LLP

(57) ABSTRACT

An image forming apparatus is provided. The image forming apparatus includes an image forming part to form a pattern including at least one white dot line and at least one black dot line on an image forming medium using a photoconductive drum. A registration sensor is to sense an amount of light reflected from the image forming medium. A processor is to determine a state of the photoconductive drum based on the amount of sensed light in the pattern.

15 Claims, 11 Drawing Sheets

(56) References Cited

U.S. PATENT DOCUMENTS

| | | |
|---|---|---|
| 2008/0025738 A1 | 1/2008 | Ahn |
| 2008/0226316 A1 | 9/2008 | Koshimura et al. |
| 2009/0041481 A1 | 2/2009 | Iida |
| 2009/0225342 A1* | 9/2009 | Ogasawara ............ H04N 1/506 358/1.9 |
| 2011/0216359 A1* | 9/2011 | Kamisuwa ................ G06F 3/12 358/1.15 |
| 2013/0050723 A1* | 2/2013 | Woo ................... G03G 15/5058 358/1.9 |
| 2017/0285552 A1 | 10/2017 | Yohei |

FOREIGN PATENT DOCUMENTS

| | | |
|---|---|---|
| JP | 2005189493 A | 7/2005 |
| JP | 2016145915 A | 8/2016 |
| KR | 1019940010607 | 10/1994 |
| KR | 1019960018785 | 6/1996 |
| KR | 1020150010188 | 1/2015 |

* cited by examiner

【Figure 1】
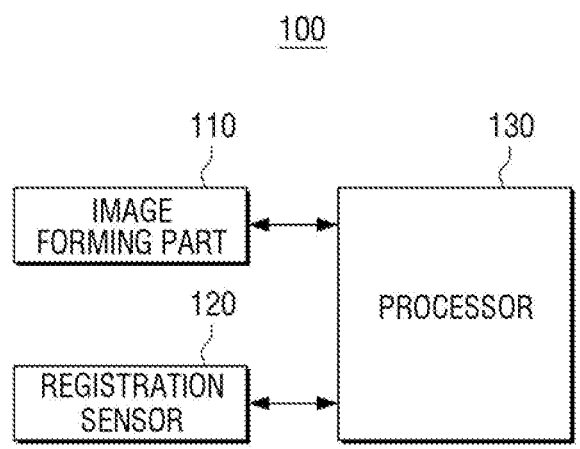
【Figure 2】
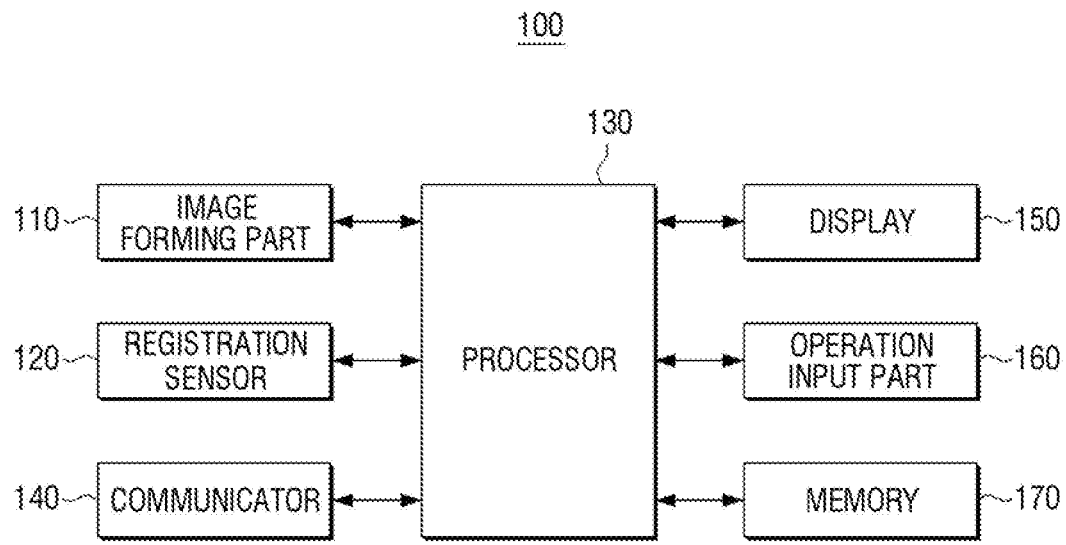

[Figure 3]
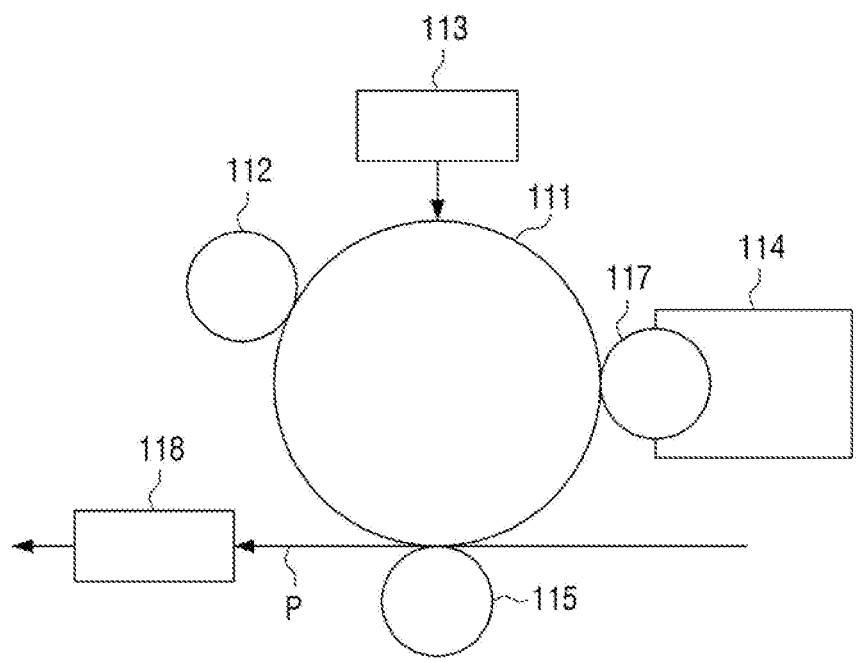

【Figure 4】
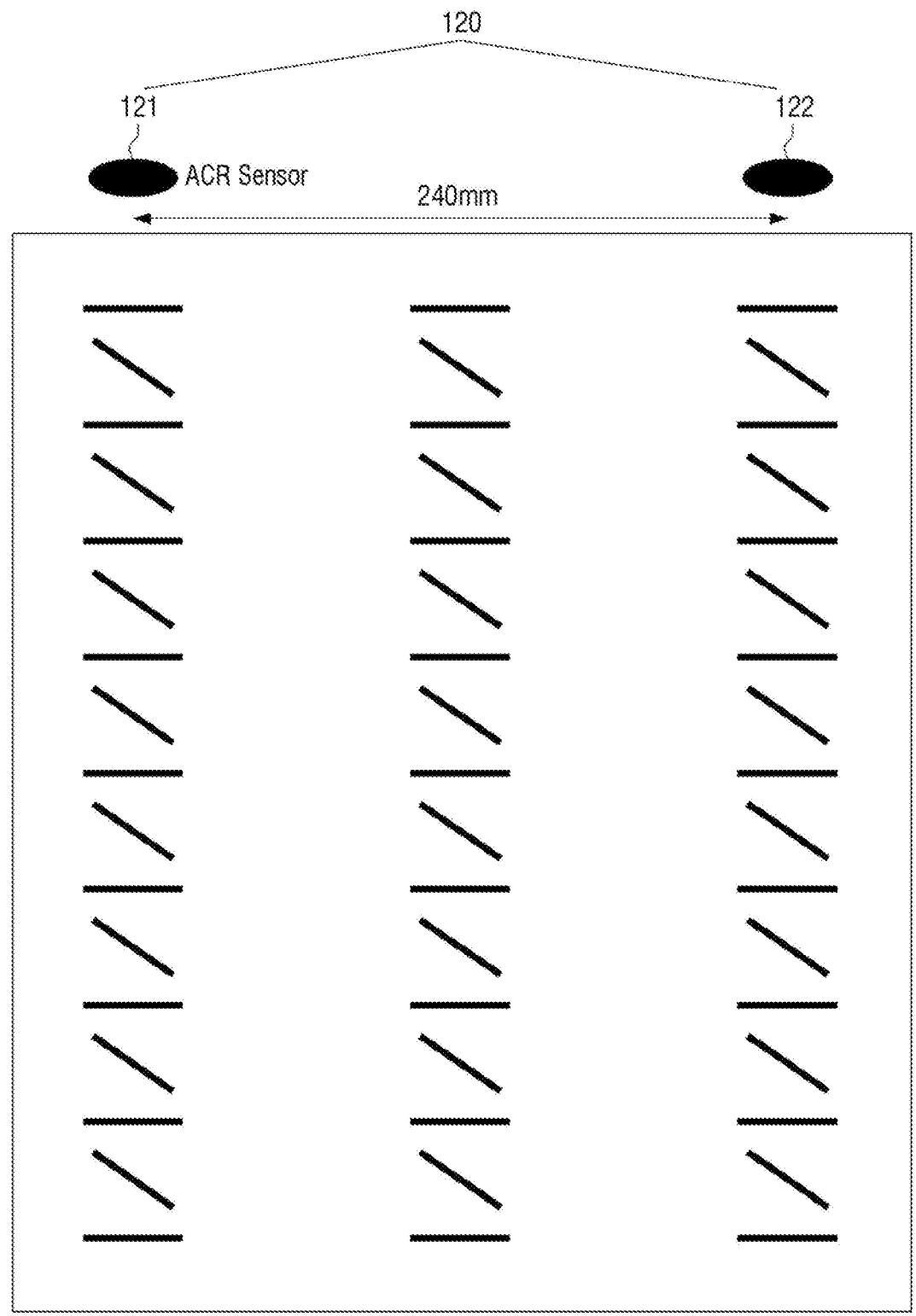

[Figure 5]
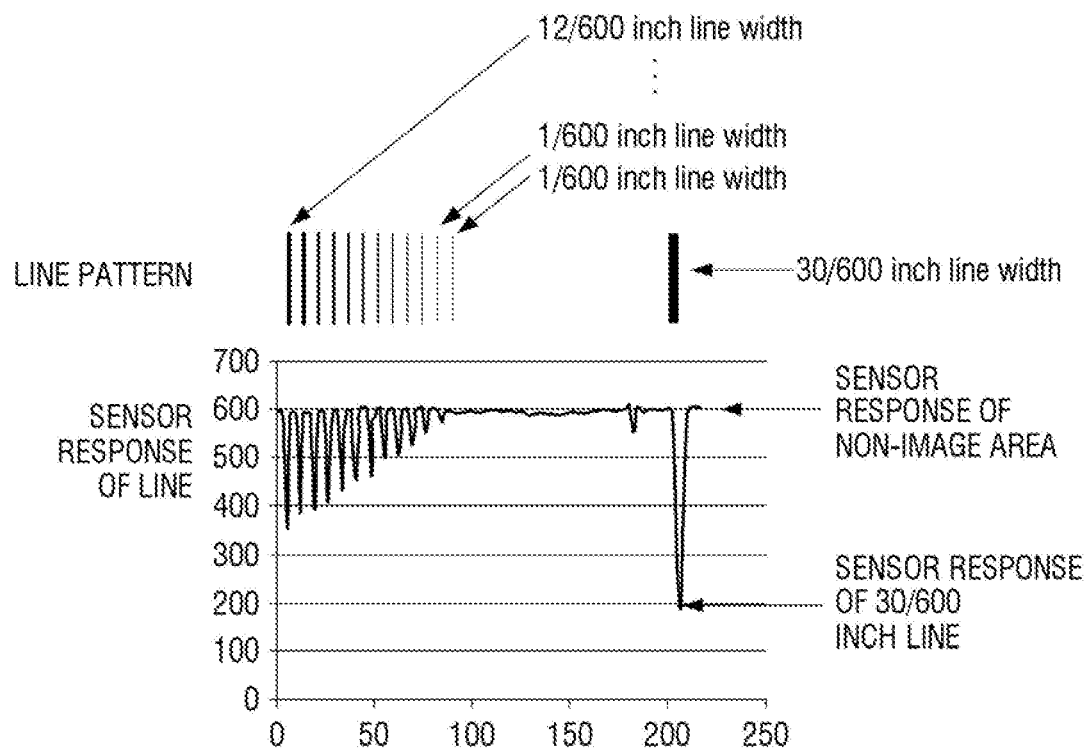

[Figure 6]
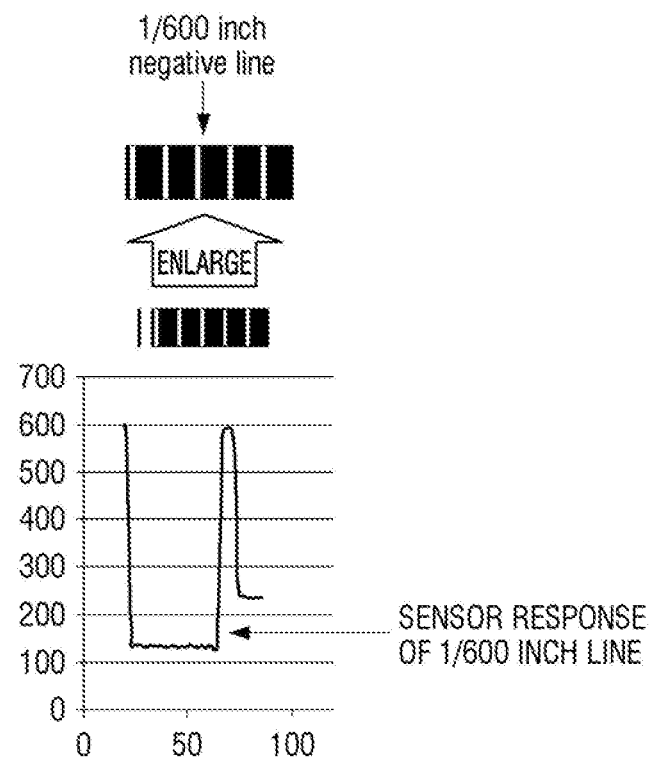

[Figure 7]
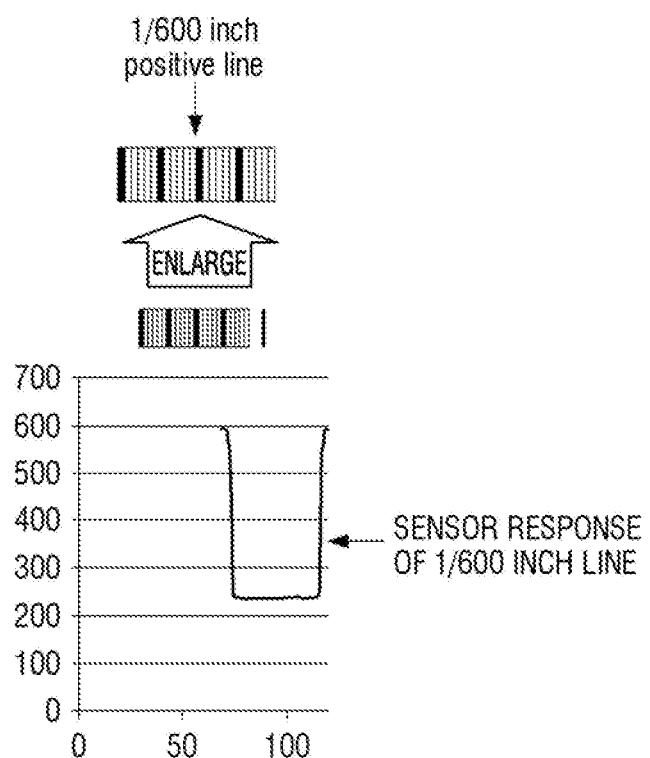

【Figure 8】
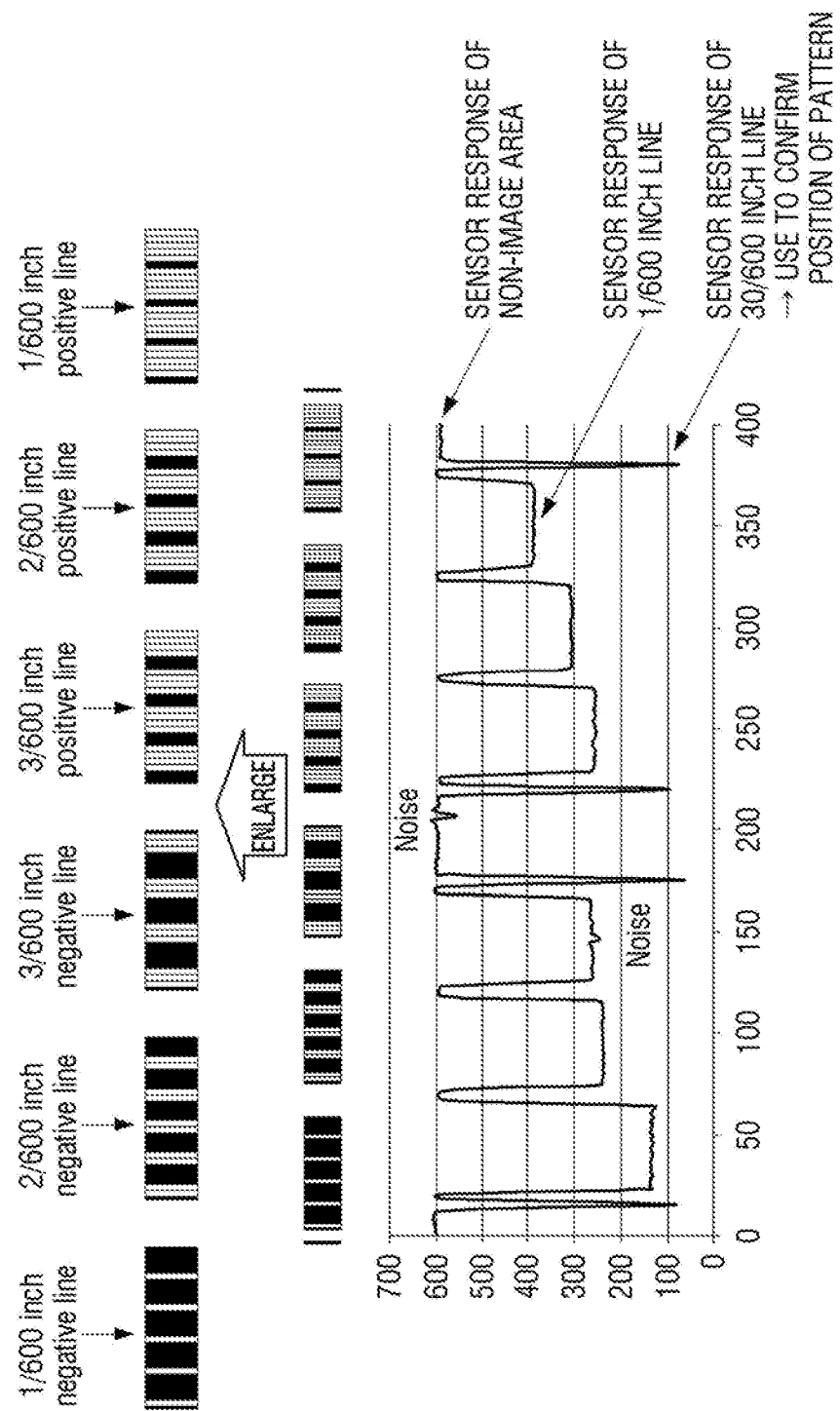

【Figure 9】
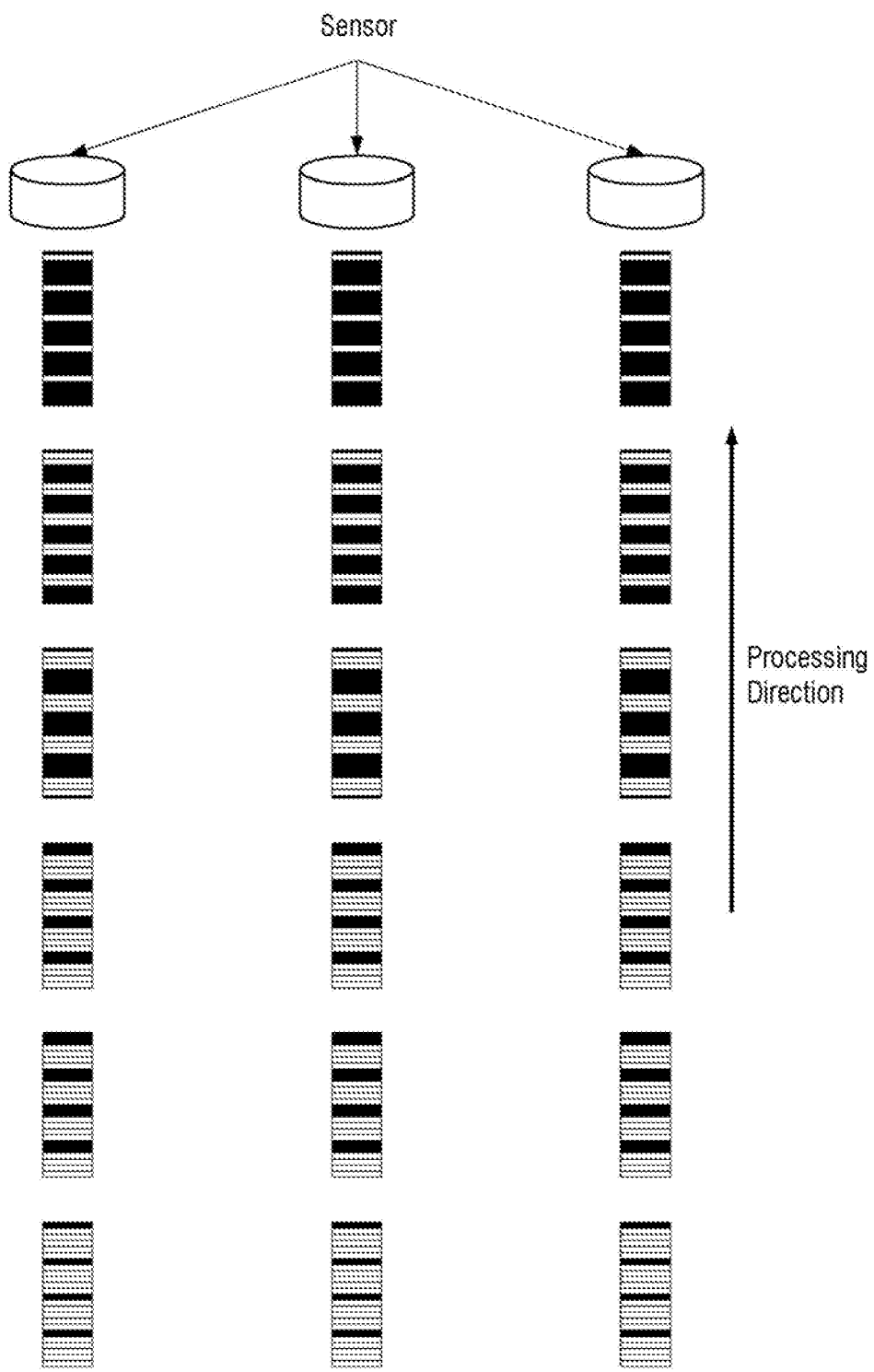

【Figure 10】
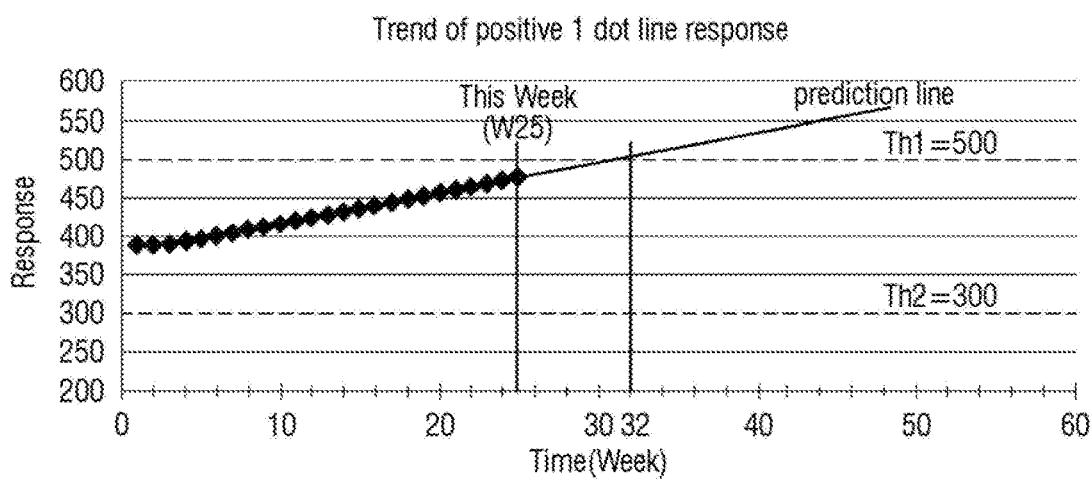
【Figure 11】
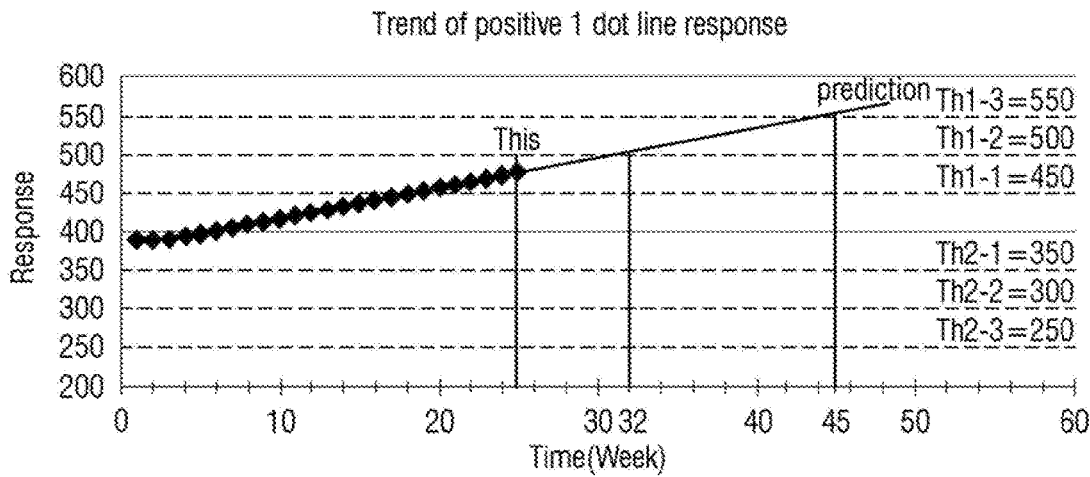

[Figure 12]
[Figure 13]
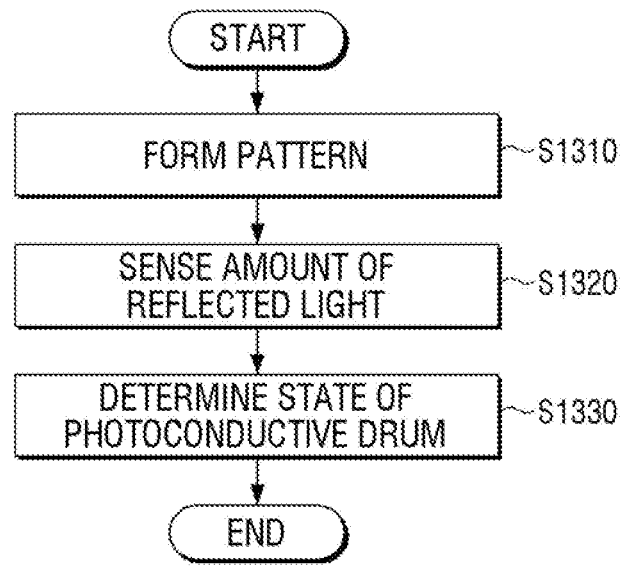

[Figure 14]
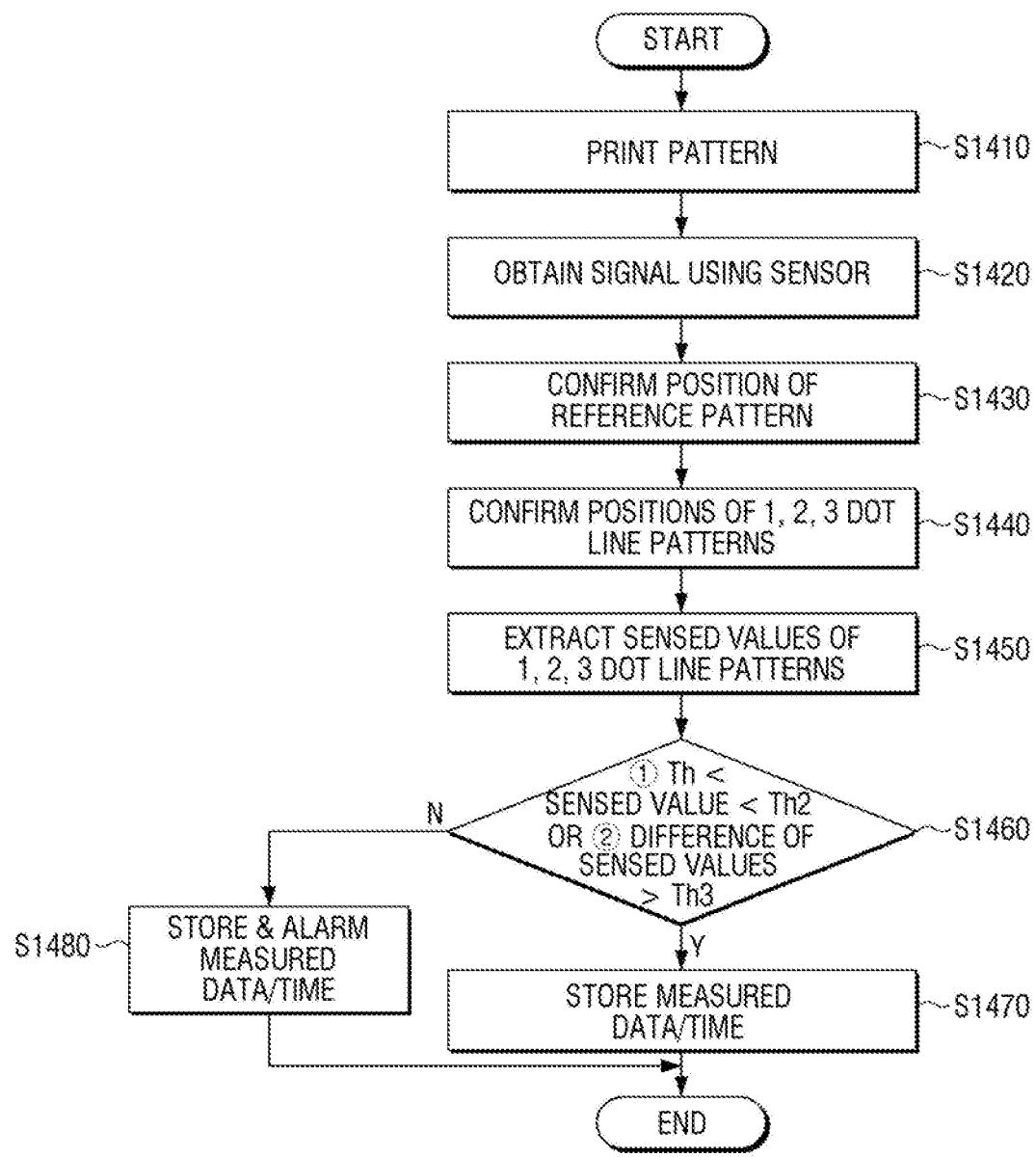

IMAGE FORMING APPARATUS FOR DIAGNOSIS CONSUMABLE DEVICE AND METHOD FOR IMAGE FORMING THEREOF

CROSS-REFERENCE TO RELATED APPLICATIONS

This application is filed under 35 U.S.C. § 371 as a PCT national phase of PCT International Application No. PCT/KR2018/009810, filed on Aug. 24, 2018, in the Korean Intellectual Property Office, which claims the priority benefit of Korean Patent Application No. 10-2018-0008157, filed on Jan. 23, 2018, in the Korean Intellectual Property Office. The contents of the PCT International Application No. PCT/KR2018/009810 and the Korean Patent Application No. 10-2018-0008157 are incorporated by reference herein.

BACKGROUND ART

A typical example of an image forming apparatus which is an apparatus performing generation, printing, reception, transmission, or the like, of image data may include a printer, a copier, a facsimile, and a multi-function printer of integrating and implementing functions thereof.

The image forming apparatus includes consumables such as a photoconductive drum and the like for performing a printing job, and an image quality is deteriorated depending on the degree of use of consumables.

DISCLOSURE

Description of Drawings

FIG. 1 is a block diagram illustrating a simple configuration of an image forming apparatus according to the present disclosure;

FIG. 2 a block diagram illustrating a detailed configuration of the image forming apparatus according to the present disclosure;

FIG. 3 is a configuration view of an image forming part of FIG. 1;

FIG. 4 is a view illustrating a color registration operation;

FIG. 5 is a view illustrating a response of a registration sensor according to a line thickness;

FIG. 6 is a view illustrating a sensor response of a negative pattern;

FIG. 7 is a view illustrating a sensor response of a positive pattern;

FIG. 8 is a view illustrating a sensor response of a plurality of patterns;

FIG. 9 is a view illustrating an example of a registration pattern for determining one-sided wear of a photoconductive drum;

FIG. 10 is a view illustrating an operation of determining a replacement time based on one reference value;

FIG. 11 is a view illustrating an operation of determining a replacement time based on a plurality of reference values;

FIG. 12 is a diagram illustrating an example of a user interface window which may be displayed on a display of FIG. 2;

FIG. 13 is a flowchart illustrating an image forming method according to the present disclosure; and FIG. 14 is a flowchart illustrating a method for diagnosing consumables according to the present disclosure.

MODE FOR INVENTION

Hereinafter, various exemplary embodiments of the present disclosure will be described in detail with reference to the accompanying drawings. The exemplary embodiments to be described below may also be modified in various forms. In order to more clearly describe features of the exemplary embodiments, a detailed description of matters known to those to skilled in the art to which the exemplary embodiments belong will be omitted.

Meanwhile, in the present specification, a case in which any component is "connected" with another component includes a case in which any component is 'directly connected' to another component and a case in which any component is 'connected to another component while having the other component interposed therebetween'. In addition, a case in which any component "comprises" another component means that any component may further comprise other components, not exclude other components, unless explicitly described to the contrary.

In the present specification, an "image forming job" may refer to various jobs (e.g., a printing, a scan, or a fax) related to an image such as formation of the image or generation/storing/transmission of an image file, and a "job" may refer not only to the image forming job, but also to a series of processes required to perform the image forming job.

In addition, an "image forming apparatus" refers to a device of printing print data generated from a terminal such as a computer on a recoding paper. Examples of the image forming apparatus described above may include a copier, a printer, a facsimile, a multi function printer (MFP) of complexly implementing functions thereof through a single device, or the like. The image forming apparatus may mean all devices capable of performing an image forming task, such as the printer, the scanner, the fax machine, the multi-function printer (MFP), or a display.

In addition, a "hard copy" may mean an operation of outputting the image to a print medium such a paper or the like, and a "soft copy" may mean an operation of outputting the image to the display device such as a TV, a monitor, or the like.

In addition, "contents" may mean all kinds of data that are subject to the image forming job, such as photos, images, document files, or the like.

In addition, "print data" may mean data converted into printable format by the printer. Meanwhile, when the printer supports a direct printing, a file itself may be the print data.

In addition, a "user" may mean a person performing an operation related to the image forming job using the image forming apparatus, or using a device which is connected wired/wirelessly with the image forming apparatus. In addition, a "manager" may mean a person having authority to access all functions of the image forming apparatus and a system. The "manager" and the "user" may also be the same person.

FIG. 1 is a block diagram illustrating a simple configuration of an image forming apparatus according to the present disclosure.

Referring to FIG. 1, an image forming apparatus 100 includes an image forming part 110, a registration sensor 120, and a processor 130.

The image forming part 110 forms an image. Specifically, the image forming part 110 may form the image on an image forming medium on which the image is formed, such as a photoconductive drum, an intermediate transfer belt, and a paper conveying belt.

In addition, the image forming part 110 may form a mark that is determined for color registration correction on the image forming medium.

In addition, the image forming part 110 may form a pattern that is determined for detecting a state of consumables on the image forming medium. Here, the predetermined pattern may be a negative pattern in which at least one white dot line and a plurality of black dot lines are repeatedly disposed in a sub-scanning direction or a positive pattern in which at least one black dot line and a plurality of white dot lines are repeatedly disposed in the sub-scanning direction. A detailed form of the negative pattern and the positive pattern will be described below with reference to FIGS. 6 and 7.

In addition, the image forming medium, which is a medium on which the predetermined pattern is formed, may be an intermediate transfer belt, a transfer belt, or a photoconductive drum.

In this case, the image forming part 110 may form a plurality of predetermined patterns having different numbers of white dot lines to have predetermined intervals in the sub-scanning direction. In addition, the image forming part 110 may form a plurality of predetermined patterns described above at a plurality of positions which are spaced apart from each other in a main-scanning direction. Such a layout form will be described below with reference to FIGS. 8 and 9.

In this case, the image forming part 110 may additionally form a reference pattern having a predetermined width at a front end of the predetermined pattern described above. Specifically, if the consumables are old, there is a possibility that the predetermined pattern may be not recognized. Therefore, the image forming part 110 may easily confirm a position of the predetermined pattern by forming the reference pattern at the front end of the predetermined pattern.

The image forming part 110 prints print data. Specifically, the image forming part 110 may print the print data received through a communicator 140 to be described below.

The registration sensor 120 senses an amount of light reflected from the image forming medium. Specifically, the registration sensor 120 may irradiate light to the image forming medium and sense an amount of light reflected from the image forming medium. Such a registration sensor 120 may include at least one light emitting element that irradiates light to the image forming medium and a light receiving sensor that receiving the light reflected from the image forming medium. In the present disclosure, a combination of the light emitting element and the light receiving sensor is referred to as a registration sensor, but only the light receiving sensor is also referred to as the registration sensor.

Meanwhile, upon implementing, a plurality of registration sensors 120 may be disposed at a plurality of positions which are spaced apart from each other in the main-scanning direction of the image forming medium. Such a layout form will be described below with reference to FIGS. 4 and 9.

The processor 130 controls the respective components in the image forming apparatus 100. Specifically, if the processor 130 receives the print data from a print control terminal (not shown), the processor 130 may control the image forming part 110 to print the received print data. Here, the print control terminal, which is an electronic device providing the print data, may be a PC, a notebook, a tablet PC, a smartphone, a server, and the like.

In addition, the processor 130 may determine whether or not a color registration needs to be performed. Specifically, the processor 130 may determine that the color registration needs to be performed, when the image forming apparatus 100 performs the printing by a predetermined number of print sheets or when a command of performing the color registration is input from a print control terminal (not shown) or an operation input part 160, based on history information stored in a memory 170. Upon implementing, the processor 130 may be implemented to perform the operation as described above even in a case in which a concentration correction is required.

In addition, if it is determined that the color registration needs to be performed, the processor 130 may control the image forming part 110 and the registration sensor 120 so that the color registration is performed. Specifically, the processor 130 may control the image forming part 110 so that a predetermined mark as illustrated in FIG. 4 is formed on the image forming medium, and may control the registration sensor 120 so that the predetermined mark formed on the image forming medium is sensed. In addition, the processor 130 may perform the color registration based on a position of the sensed mark.

In addition, the processor 130 may determine whether or not it is necessary to confirm a state of the consumables. Specifically, the processor 130 may determine that it is necessary to perform the confirmation of the state of the consumables, when the image forming apparatus 100 performs the printing by a predetermined number of print sheets or when a command of confirming the state of the consumables is input from a print control terminal (not shown) or an operation input part 160, based on history information stored in a memory 170. Meanwhile, upon implementing, such an operation may be performed separately from the color registration operation described above, and may also be performed together with the color registration operation described above.

In addition, if it is determined that it is necessary to confirm the state of the consumables, the processor 130 may control the image forming part 110 so that a predetermined pattern including at least one white dot line is formed on the image forming medium. In addition, the processor 130 may control the registration sensor 120 to sense an amount of light reflected from the image forming medium.

In addition, the processor 130 may determine a state of the photoconductive drum based on an amount of sensed light in the predetermined pattern. Specifically, the processor 130 may determine a wear state of the photoconductive drum based on an average amount of sensed light in the predetermined pattern. In this case, the processor 130 may determine the wear state of the photoconductive drum by using a value obtained by averaging the remaining values except for a maximum value and a minimum value in order to remove noise.

In addition, in a case in which a plurality of predetermined patterns are formed in a main-scanning direction, the processor 130 may also determine one-sided wear state of the photoconductive drum based on a plurality of average amounts of sensed light with respect to the plurality of predetermined patterns. Specifically, if a difference between a value of an average amount of left light and a value of an average amount of right light is a predetermined value or more, the processor 130 may determine that one-sided wear has occurred. Meanwhile, in a case in which three registration sensors are provided, the processor 130 may determine the one-side wear state by comparing a value of an amount of light sensed by a center registration sensor with a value of an amount of light sensor by a left or right registration sensor.

In addition, the processor 130 may determine whether or not the photoconductive drum is replaced by comparing an amount of sensed light in the predetermined pattern with a predetermined amount of light. In addition, the processor 130 may predict a replacement time of the photoconductive drum based on information indicating a value of an amount of light which is pre-stored in the memory 170 and information indicating a value of an amount of sensed light. For this operation, the processor 130 may store the information indicating the value of the amount of sensed light in the memory 170.

In addition, in a case in which the replacement of the photoconductive drum is required or a scheduled time for replacement of the photoconductive drum is imminent, the processor 130 may control a display 150 to display information thereof. In addition, upon implementing, if the replacement time of the photoconductive drum is within a predetermined period (e.g., one week), the processor 130 may control a communicator 140 so that information thereof is notified to a management server (not shown) or a manager, and may also order the corresponding consumables.

In addition, if the print data is received, the processor 130 may generate binary data by performing a processing such as parsing for the received print data, and may control the image forming part 110 so that the generated binary data is printed.

As described above, the image forming apparatus 100 according to the present disclosure does not detect the state of the consumables based on the number of print sheets but senses a change in resolution depending on aging of the consumables, thereby making it possible to detect an accurate state of the consumables. In addition, since the image forming apparatus 100 utilizes the registration sensor 120 mounted in an existing image forming apparatus without additionally mounting a separate sensor, it is possible to reduce the cost. In addition, since the image forming apparatus 100 may predict the replacement time by continuously monitoring the state of the consumables and provide the information thereof, convenience of a user is improved.

Meanwhile, hereinabove, although only simple configurations configuring the image forming apparatus have illustrated and described, various configurations may be additionally included upon implementing. This will be described below with reference to FIG. 2.

FIG. 2 is a block diagram illustrating a detailed configuration of the image forming apparatus according to the present disclosure.

Referring to FIG. 2, the image forming apparatus 100 according the present disclosure includes the image forming part 110, the registration sensor 120, the processor 130, a communicator 140, a display 150, an operation input part 160, and a memory 170.

Since the image forming part 110, the registration sensor 120, and the processor 130 perform the same functions as the configurations of FIG. 1, an overlapped description will be omitted.

The communicator 140 is connected to a print control terminal (not shown) and receives the print data from the print control terminal. Specifically, the communicator 140 is formed to connect the image forming apparatus 100 with an external device, and the communicator 140 may be connected to the terminal through a local area network (LAN) and an Internet network as well as through an universal serial bus (USB) port or a wireless communication (e.g., WiFi 802.11a/b/g/h, NFC, Bluetooth) port. Such a communicator 140 may also be referred to as a transceiver.

In addition, the communicator 140 may receive a command to perform color registration or a command to detect the state of the consumables from the print control terminal (not shown). In addition, if it is determined that it is necessary to replace the consumables, the communicator 140 may notify a management server (not shown) or a manager (specifically, a terminal of the manager) of information on the replacement of the consumables.

The display 150 displays a variety of information provided by the image forming apparatus 100. Specifically, the display 150 may display a user interface window for selecting a variety of functions provided by the image forming apparatus 100. Such a display 150 may be a monitor such as an LCD, a CRT, an OLED, or the like, and may also be implemented as a touch screen that may simultaneously perform a function of the operation input part 160 to be described below.

In addition, the display 150 may display a control menu for performing the function of the image forming apparatus 100.

In addition, the display 150 displays information on the consumables. Specifically, if it is determined that it is necessary to replace the consumables, the display 150 may display replacement information and display a predicted replacement time.

The operation input part 160 may receive a function section and a control command for the corresponding function from the user. Here, the function may include a print function, a copy function, a scan function, a fax transmission function, or the like. Such a function control command may be received through the control menu displayed on the display 150.

Such an operation input part 160 may be implemented as a plurality of buttons, a keyboard, a mouse, or the like, and may also be implemented as a touch screen that may simultaneously perform the function of the display 150 described above.

The operation input part 160 may receive a command to perform color registration or a command to detect a state of the consumables from the user.

The memory 170 stores the print data. Specifically, the memory 170 stores the print data received through the communicator 140. In addition, the memory 170 stores history information of a print job performed by the image forming apparatus 100. In addition, the memory 170 may store a surface state bad section that is confirmed in the color registration process.

In addition, the memory 170 may store an amount of sensed light for the predetermined pattern or state information of the consumables corresponding to the amount of sensed light.

Meanwhile, the memory 170 may be implemented as a storage medium in the image forming apparatus 100 and an external storage medium, for example, a removable disk including a universal serial bus (USB) memory, a web server via a network, and the like.

Meanwhile, in illustrating and describing FIGS. 1 and 2, although it is described that only the replacement time of the photoconductive drum is determined, the operations described above may also be applied to other consumables other than the photoconductive drum as long as they are configurations that affects quality of image.

Meanwhile, in describing FIGS. 1 and 2, although it is illustrated and described that the information (e.g., the amount of sensed light) on the photoconductive drum is stored in the memory of the image forming apparatus, the information on the photoconductive drum may also be stored in a memory (i.e., a CRUM unit) within the photoconductive drum.

FIG. 3 is a configuration view of the image forming part of FIG. 1.

Referring to FIG. 3, the image forming part 110 may include a photoconductive drum 111, a charger 112, an exposure machine 113, a developing device 114, a transfer 115, and a fixer 118.

The image forming part 110 may further include a feeding means (not shown) for supplying a recording medium P. An electrostatic latent image is formed on the photoconductive drum 111. The photoconductive drum 111 may be referred to as the photoconductive drum, a photoconductive belt, or the like depending on a form thereof.

Hereinafter, for convenience of explanation, only a configuration of the image forming part 110 corresponding to one color will be described by way of example, but upon implementing, the image forming part 110 may include a plurality of photoconductive drums 111, a plurality of chargers 112, a plurality of exposers 113, and a plurality of developing devices 114 that correspond to a plurality of colors. In this case, the image forming part 110 may further include an intermediate transfer belt for forming the image formed by the plurality of photoconductive drums on one print paper.

The charger 112 charges a surface of the photosensitive drum 111 with a uniform potential. The charger 112 may be implemented in a form of a corona charger, a charge roller, a charge brush, or the like.

The exposer 113 forms the electrostatic latent image on the surface of the photoconductive drum 111 by changing a surface potential of the photoconductive drum 111 according to information of an image to be printed. As an example, the exposer 113 may form the electrostatic latent image by irradiating light modified according to the information on the image to be printed to the photoconductive drum 111. This type of exposer 113 may be referred to as a light scanner, and an LED may be used as a light source.

The developing device 114 accommodates a developer therein and supplies the developer to the electrostatic latent image to develop the electrostatic latent image into a visible image. The developing device 114 may include a developing roller 117 that supplies the developer to the electrostatic latent image. For example, the developer may be supplied to the electrostatic latent image formed on the photoconductive drum 111 from the developing roller 117 by a developing electric field formed between the developing roller 117 and the photoconductive drum 111.

The visible image formed on the photoconductive drum 111 is transferred to the recording medium P by the transfer 115 or an intermediate transfer belt (not shown). The transfer 115 may, for example, transfer the visible image to the recording medium by an electrostatic transfer method. The visible image is attached to the recording medium P by electrostatic attraction.

The fixer 118 fixes the visible image on the recording medium P by applying heat and/or pressure to the visible image on the recording medium P. A printing job is completed by a series of processes as described above.

Since the above-mentioned developer is used whenever an image forming job is performed, the developer becomes exhausted when it is used for a predetermined time or more. A unit (for example, the above-mentioned developing device 114) itself for storing the developer needs to be newly replaced.

In addition, the photoconductive drum is aged whenever the image forming job is performed, and therefore, if it is used for a predetermined time or more, a coated layer on a surface of the photoconductive drum becomes thinner and it is gradually difficult for the photoconductive drum to output with high resolution. Therefore, if the coated layer on the surface of the photoconductive drum is worn, the photoconductive drum itself needs to be newly replaced.

As such, replaceable parts or components during the usage of the image forming apparatus are called consumable units or replaceable units. In addition, such a consumable unit may be attached with a memory (or a CRUM chip) for proper management of the corresponding consumable unit.

Meanwhile, in order to detect defects or aging of the consumables such as the photoconductive drum, it is necessary to be able to measure a basic unit (resolution) of the image forming apparatus. That is, in order to sense the defect of the consumables of the photoconductive drum, a sensor capable of sensing a thickness of a $1/600$ inch line is required.

However, since the sensor capable of sensing the above-mentioned thickness is relatively expensive, it has been conventionally determined that it is necessary to replace the photoconductive drum when the print jobs of a predetermined number or more are performed by the image forming apparatus without using the sensor in the image forming apparatus.

However, since such a determination is not accurate, there was a problem that it may be determined that the photoconductive drum needs to be replaced even though the photoconductive drum is substantially not worn, and appropriate confrontational actions may not be taken even in a case in which the photoconductive drum is rapidly worn and the quality of image of the image forming apparatus is lowered.

Meanwhile, in consideration of the fact that the image forming apparatus includes a sensor of lower resolution for registration, a method capable of a worn state of the consumables utilizing a resolution sensor of low resolution will be hereinafter described.

FIG. 4 is a view illustrating a color registration operation and FIG. 5 is a view illustrating a response of a registration sensor 120 according to a line thickness.

A plurality of registration sensors 121 and 122 may be disposed to be spaced apart from each other in the main-scanning direction of the image forming medium.

Such a registration sensor 120, which is a sensor for purpose of correcting a tone, is used to obtain a signal of the image formed on the intermediate transfer belt or the photoconductive belt and to diagnose and/or correct color position error and tone error.

In order to correct the color registration, position information of the line is obtained by printing a pattern of a line form of concentration of 100% as illustrated in FIG. 4 and analyzing the obtained signal using the color registration sensor. In addition, the processor 130 corrects position error by analyzing the obtained information.

Since such a registration sensor 120 is for purpose of the position correction and the tone correction, it has relatively low resolution.

Referring to FIG. 5, since a difference between a sensor response of a non-image area of a $30/600$ inch line and a sensor response of the line is large, the $30/600$ inch line is easily measured. In addition, since a patch for measuring the concentration uses a pattern of several mm or more in size, a sensor response is stable.

However, the line of the basic unit (resolution) of the image forming apparatus needs to be able to be measured to detect the defect of the consumables as described above, but since a sensor response of the line of the basic unit has a response value lower than a sensor response of noise due to ITB shake or the like as illustrated in FIG. 5, it is not easy to simply distinguish the line of the basic resolution and noise by the registration sensor 120.

Therefore, according to the present disclosure, a negative pattern or a positive pattern including at least one white dot line is formed on the image forming medium. A negative pattern, or a positive pattern, including a ratio of at least one white dot line and at least one black dot line, is formed a plurality of times, on the image forming medium.

Hereinafter, the negative pattern will be described with reference to FIG. 6, the positive pattern will be described with reference to FIG. 7, and various combinations thereof will be described with reference to FIGS. 8 and 9.

FIG. 6 is a view illustrating a sensor response of a negative pattern.

Referring to FIG. 6, the negative pattern has at least one white dot line and a plurality of black dot lines (four in an illustrated example) which are repeatedly disposed in a sub-scanning direction. The negative pattern is configured in a form in which one white dot and four black dots are repeated five times in the illustrated example, but upon implementing, a ratio of the white dot and the black dot may be changed and the number of repetitions may also be changed.

As described above, since the pattern having resolution of the 1/600 inch line is repeatedly disposed in the sub-scanning direction, the registration sensor of low resolution may output a stable sensor response.

FIG. 7 is a view illustrating a sensor response of a positive pattern.

Referring to FIG. 7, the positive pattern has at least one black dot line and a plurality of white dot lines (four in an illustrated example) which are repeatedly disposed in the sub-scanning direction. The positive pattern is configured in a form in which one black dot and four white dots are repeated five times in the illustrated example, but upon implementing, a ratio of the white dot and the black dot may be changed and the number of repetitions may also be changed.

As described above, since the pattern having resolution of the 1/600 inch line is repeatedly disposed in the sub-scanning direction, the registration sensor of low resolution may output a stable sensor response.

FIG. 8 is a view illustrating sensor responses of a plurality of patterns.

Referring to FIG. 8, three negative patterns and three positive patterns are disposed.

A first negative pattern has resolution of a 1/600 inch line, a second negative pattern has resolution of a 2/600 inch line, and a third negative pattern has resolution of a 3/600 inch line.

In addition, a first positive pattern has resolution of a 3/600 inch line, a second positive pattern has resolution of a 2/600 inch line, and a third positive pattern has resolution of a 1/600 inch line.

Meanwhile, in order to easily detect the position of the pattern according to the present disclosure, a reference pattern may be additionally disposed in front of the first negative pattern by a predetermined distance.

Specifically, the user may utilize the image forming apparatus at various resolutions, and that is, it is sufficient for the user who does not perform the printing job at low resolution to secure only resolution lower than basic resolution. Therefore, an OPC replacement time may be differently detected by forming patterns in which the ratio of the white dot and the black dot is different.

An operation of detecting the OPC replacement time using the patterns described above will be described below with reference to FIGS. 10 and 11.

FIG. 9 is a view illustrating an example of a registration pattern for determining one-sided wear of a photoconductive drum.

Referring to FIG. 9, a plurality of registration sensors are disposed to be spaced apart from each other in the main-scanning direction. In this case, the image forming apparatus may print a plurality of predetermined patterns corresponding to the positions of the registration sensors.

In this case, an aging state of the image forming apparatus for each of the positions thereof may be detected and the degree of one-side wear of the image forming apparatus may be determined. Meanwhile, it is illustrated and described in the illustrated example that the patterns are formed at three positions, but upon implementing, the patterns may also be formed at only two positions and the patterns may also be formed at four or more positions.

FIG. 10 is a view illustrating an operation of determining a replacement time based on one reference value.

When the replacement time is determined, it may be detected that the replacement is required if a value of an amount of sensed light is compared with a predetermined threshold value and the value of the amount of sensed light is greater than the predetermined threshold value. Meanwhile, the threshold value may be varied depending on whether the pattern is the positive pattern or the negative pattern, and may also be varied depending on whether the line is one dot line or two dot lines.

Such a reference may be defined as follows.

Threshold Value of Positive 1 Dot Line (Th1, Th2)

A first threshold value may be a median value (e.g., 500) of a sensed value (e.g., 600) of a non-image area and a sensed value (e.g., 400) of a positive 1 dot line of a normal state.

A second threshold value may be a value (e.g., 300) smaller than the sensed value (e.g., 400) of the positive 1 dot line of the normal state.

Threshold Value of Negative 1 Dot Line (Th1', Th2')

A first threshold value Th1' may be a median value (e.g., 100) of a sensed value (e.g., 80) of a sufficiently thick line and a sensed value (e.g., 120) of a negative 1 dot line of a normal state.

A second threshold value Th2' may be a value (e.g., 140) greater than the sensed value (e.g., 120) of the negative 1 dot line of the normal state.

Here, the first threshold value Th1 and the first threshold value Th1' are threshold values used to determine whether or not a direct replacement is required, and the second threshold value Th2 and the second threshold value Th2' are threshold values used to confirm whether the amount of sensed light has reliability. Therefore, upon implementing, only the first threshold value Th1 and the first threshold value Th1' may also be used to determine whether or not the replacement is required.

Meanwhile, in consideration of the fact that the image forming apparatus need to be able to perform the printing job at all times, the image forming apparatus may periodically store the amount of sensed light and may predict a point of time at which a change in the value of the amount of light is greater than the predetermined threshold value as illustrated in FIG. 10.

In addition, the predicted point of time is positioned within a predetermined period (e.g., one week), the image forming apparatus may notify the user that the replacement of the photoconductive drum is required Meanwhile, although not illustrated in FIG. 10, it may be additionally confirmed whether or not a difference of an amount of sensed light at a left or right side is out of a third threshold value.

Here, the third threshold value may be determined by an experiment. For example, the third threshold value of 20 may be applied to the positive 1 dot line and the third threshold value of 10 may be applied to the negative 1 dot line. Upon implementing, the third threshold value which is common to the positive and negative lines may also be applied.

FIG. 11 is a view illustrating an operation of determining a replacement time based on a plurality of reference values.

Referring to FIG. 11, a plurality of reference values are provided. A first reference value having a level at which a little thin positive 1 dot line is output corresponds to a point of time at which the replacement of the photoconductive drum is required for a high definition user, or a point of time at which a general image quality user may use the photoconductive drum.

A second reference value having a level at which a thinner positive 1 dot line is output corresponds to a point of time at which the replacement of the photoconductive drum is required for the general image quality user, or a point of time at which a low image quality user may use the photoconductive drum.

A third reference having a level at which it is difficult to form the positive 1 dot line corresponds to a point of time at which the replacement of the photoconductive drum is required for all users.

Meanwhile, the reference value described above may be classified based on a usual printing form of the user. For example, if the user generally performs a large number of printing jobs using the maximum resolution, it is possible to determine whether or not the photoconductive drum is replaced with the first reference. On the other hand, if the user generally performs a large number of printing jobs using a toner saving mode, it is possible to determine whether or not the photoconductive drum is replaced based on the third reference.

FIG. 12 is a diagram illustrating an example of a user interface window which may be displayed on a display of FIG. 2.

Referring to FIG. 12, a user interface window 1200 displays information on consumables. Specifically, if it is determined that the replacement of the photoconductive drum is required, the user interface window 1200 may display replacement information.

Meanwhile, in the illustrated example, the user interface window 1200 displays only the information that the replacement of the photoconductive drum is required, but it may also display information on a replacement prediction time.

FIG. 13 is a flowchart illustrating an image forming method according to the present disclosure.

A predetermined pattern including at least one white dot line is formed on the image forming medium using the photoconductive drum (S13100). Here, the formed pattern may be a negative pattern in which at least one white dot line and a plurality of black dot lines are repeatedly disposed in a sub-scanning direction or a positive pattern in which at least one black dot line and a plurality of white dot lines are repeatedly disposed in the sub-scanning direction. In addition, upon implementing, both the negative pattern and the positive pattern may be formed on the image forming medium, and a plurality of negative patterns and/or a plurality of positive patterns in which a ratio of the white dot and the black dot is different as well as one negative pattern or one positive pattern may be formed. In addition, a plurality of patterns may be formed to correspond to the number of registration sensors.

An amount of light reflected from the image forming medium is sensed (S1320). Specifically, the amount of light reflected from the image forming medium may be sensed using the registration sensor.

A state of the photoconductive drum is determined based on an amount of sensed light in the predetermined pattern (S1330). Specifically, a wear state of the photoconductive drum may be based on an average amount of sensed light in the predetermined pattern. In addition, whether or not the replacement of the photoconductive drum is required may be determined by comparing the amount of sensed light in the predetermined pattern with the value of the predetermined amount of light. In addition, the replacement time of the photoconductive drum may also be predicted based on a pre-stored amount of light and the amount of sensed light.

Therefore, the image forming method according to the present disclosure does not detect the state of the consumables based on the number of print sheets, but senses a change in resolution depending on aging of the consumables, thereby making it possible to detect an accurate state of the consumables. In addition, since the image forming method according to the present disclosure utilizes the registration sensor mounted in an existing image forming apparatus without additionally mounting a separate sensor, it is possible to reduce the cost. In addition, since the image forming method according to the present disclosure may predict the replacement time by continuously monitoring the state of the consumables and provide the information thereof, convenience of a user is improved. The image forming method as illustrated in FIG. 13 may be executed on the image forming apparatus having the configuration of FIG. 1 or 2, and may also be executed on the image forming apparatus having other configurations.

Meanwhile, the image forming method described above may be implemented in a program and may be provided to a display. In particular, the program including the image forming method may be stored and provided in a non-transitory computer readable medium.

The non-transitory computer readable medium does not mean a medium that stores data for a short period such as a register, a cache, a memory, or the like, but means a machine readable medium that semi-permanently stores the data. Specifically, various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

FIG. 14 is a flowchart illustrating a method for diagnosing consumables according to the present disclosure.

Referring to FIG. 14, a predetermined pattern may be formed on the image forming medium (S1410). Hereinafter, a description will be provided assuming that the pattern as illustrated in FIG. 9 is formed, for convenience of explanation.

In addition, a response signal may be obtained using the registration sensor (S1420).

If a position of a relatively thick reference pattern positioned at the beginning of the pattern is sensed through the registration sensor (S1430), positions of 1, 2, 3 dot line patterns which are continuously positioned may be confirmed (S1440) and sensed values of the 1, 2, 3 dot line patterns may be extracted (S1450).

Specifically, in a case in which the photoconductive drum is abnormal, since the 1 dot line is not printed, the reference pattern may be positioned to confirm the position of the pattern, and the positions of the predetermined patterns may be detected by sensing the reference pattern.

If the sensed values of the 1, 2, 3 dot line patterns are extracted, a representative value of the sensed patterns may be determined based on the extracted sensed values. In this case, an average value of the respective dot lines may be used, and in order to remove noise, an average of the remaining values except for the maximum value and the minimum value may be used. For example, the sensed values of the positive 1 dot line are 389,399,387,387,389, 388,387,389, and 376, an average (388) of seven values except for the maximum value of 399 and the minimum value of 376 may be determined as the representative value. Meanwhile, the sensed values of a specific pattern are three values at left/middle/right and measured values thereof may be six.

Next, it may be confirmed whether or not the sensed values are within the predetermined threshold values Th1 and Th2 (S1460). In addition, it may also be confirmed whether a difference of the sensed values measured at left/middle/right is a predetermined value Th3 or more. Specifically, in order to detect whether or not there is one-side wear of the photoconductive drum, it is also possible to confirm a difference of the sensed values sensed by the plurality of sensors.

As a result of the confirmation, if the sensed value is between the threshold values, measurement data and measurement time may be stored (S1470).

As a result of the confirmation, if the sensed value is out of the threshold values, the replacement time of the photoconductive drum may be predicted based on the measurement data and the predicted replacement time may be displayed (S1480).

Therefore, the method for diagnosing consumables according to the present disclosure does not detect the state of the consumables based on the number of print sheets, but senses a change in resolution depending on aging of the consumables, thereby making it possible to detect an accurate state of the consumables. In addition, since the method for diagnosing consumables according to the present disclosure utilizes the registration sensor mounted in an existing image forming apparatus without additionally mounting a separate sensor, it is possible to reduce the cost. In addition, since the method for diagnosing consumables according to the present disclosure may predict the replacement time by continuously monitoring the state of the consumables and provide the information thereof, convenience of a user is improved. The method for diagnosing consumables as illustrated in FIG. 14 may be executed on the image forming apparatus having the configuration of FIG. 1 or 2, and may also be executed on the image forming apparatus having other configurations.

Meanwhile, the method for diagnosing consumables described above may be implemented in a program and may be provided to a display. In particular, the program including the method for diagnosing consumables may be stored and provided in a non-transitory computer readable medium.

Hereinabove, the exemplary embodiments of the present disclosure have been illustrated and described, but the present disclosure is not limited to the above-mentioned exemplary embodiments and may be variously modified by those skilled in the art to which the present disclosure pertains without departing from the gist of the present disclosure as defined by the following claims. In addition, these modifications are within the scope of the following claims.

The invention claimed is:

1. An image forming apparatus comprising:
   an image forming part to form a pattern including a white dot line and a black dot line, on an image forming medium, using a photoconductive drum;
   a registration sensor to sense an amount of light reflected based on the pattern from the image forming medium; and
   a processor to control to determine a wear state of the photoconductive drum, based on the sensed amount of light reflected based on the pattern.

2. The image forming apparatus as claimed in claim 1, wherein the formed pattern is
   a negative pattern in which the white dot line being one white dot line and the black dot line being a plurality of black dot lines are repeatedly disposed in a sub-scanning direction of the image forming medium, or
   a positive pattern in which the black dot line being one black dot line and the white dot line being a plurality of white dot lines are repeatedly disposed in the sub-scanning direction.

3. The image forming apparatus as claimed in claim 1, wherein the processor is to control to determine the wear state of the photoconductive drum based on an average amount of light reflected and sensed based on the pattern as the sensed amount of light.

4. The image forming apparatus as claimed in claim 1, wherein the processor is to control to determine a replacement timing of the photoconductive drum by controlling to determine the wear state based on comparing information indicating the sensed amount of light in the pattern with information indicating an amount of light to be reflected based on the pattern.

5. The image forming apparatus as claimed in claim 4, further comprising
   a display to display replacement information based on the determined replacement timing of the photoconductive drum.

6. The image forming apparatus as claimed in claim 1, further comprising
   a memory to store information indicating a reference amount of light,
      wherein the processor is to control to predict a replacement timing of the photoconductive drum based on the stored information indicating the reference amount of light and information indicating the sensed amount of light.

7. The image forming apparatus as claimed in claim 1, wherein
   the image forming part is to form the pattern being a plurality of patterns at a plurality of positions which are spaced apart from each other in a main-scanning direction of the image forming medium, and
   the processor is to control to determine an uneven wear state of the photoconductive drum in response to the sensed amount of light reflected based on the plurality of patterns.

8. The image forming apparatus as claimed in claim 1, wherein the image forming part is to form the pattern being a plurality of patterns to include respectively different ratios of a number of the white dot line and a number of the black dot line at intervals in a sub-scanning direction of the image forming medium.

9. An image forming method in an image forming apparatus, the image forming method comprising:
   forming a pattern including a white dot line and a black dot line, on an image forming medium, using a photoconductive drum;
   sensing an amount of light reflected based on the pattern from the image forming medium using a registration sensor; and controlling to determine a wear state of the photoconductive drum based on the sensed amount of light reflected based on the pattern.

10. The image forming method as claimed in claim 9, wherein the formed pattern is
- a negative pattern in which the white dot line being one white dot line and the black dot line being a plurality of black dot lines are repeatedly disposed in a sub-scanning direction of the image forming medium, or
- a positive pattern in which the black dot line being one black dot line and the white dot line being a plurality of white dot lines are repeatedly disposed in the sub-scanning direction of the image forming medium.

11. The image forming method as claimed in claim 9, wherein the controlling to determine the wear state of the photoconductive drum is determined based on an average amount of light based on the pattern as the sensed amount of light.

12. The image forming method as claimed in claim 9, further comprising controlling to determine a replacement timing of the photoconductive drum by the controlling to determine the wear state based on comparing information indicating the sensed amount of light in the pattern with information indicating a reference amount of light to be reflected based on the pattern.

13. The image forming method as claimed in claim 12, further comprising displaying replacement information based on the determined replacement timing of the photoconductive drum.

14. The image forming method as claimed in claim 9, further comprising:
- storing information indicating a reference amount of light; and
- controlling to predict a replacement timing of the photoconductive drum based on the stored information indicating the reference amount of light and information indicating the sensed amount of light.

15. The image forming method as claimed in claim 9, wherein
- the forming, the pattern includes forming the pattern being a plurality of patterns at a plurality of positions which are spaced apart from each other in a main-scanning direction of the image forming medium, and
- the controlling to determine the wear state of the photoconductive drum includes determining an uneven wear state of the photoconductive drum in response to the sensed amount of light reflected based on the plurality of patterns.

* * * * *